United States Patent [19]

Holec

[11] 4,182,002
[45] Jan. 8, 1980

[54] MEAT TENDERIZER DEVICE

[76] Inventor: Lubomir Holec, 5220 Outer Dr., R.R. #1, Windsor, Ontario, 6J3 NGA, Canada

[21] Appl. No.: 662,518

[22] Filed: Mar. 1, 1976

[51] Int. Cl.² .............................................. A22C 9/00
[52] U.S. Cl. ........................................ 17/30; 99/532
[58] Field of Search ............... 17/30, 25; 99/532, 494, 99/533; 30/123.3; 128/218 N; 27/24 R; 32/60

[56] References Cited

U.S. PATENT DOCUMENTS

| | | | |
|---|---|---|---|
| 1,661,595 | 3/1928 | Bowen | 99/532 |
| 2,670,673 | 3/1954 | Gordon et al. | 99/532 X |
| 3,082,681 | 3/1963 | Petersen | 99/532 |
| 3,296,953 | 1/1967 | Bjorn-Henriksen et al. | 17/25 |
| 3,410,457 | 11/1968 | Brown | 99/532 |

Primary Examiner—Louis G. Mancene
Assistant Examiner—Mickey Zu
Attorney, Agent, or Firm—Barnes, Kisselle, Raisch & Choate

[57] ABSTRACT

A meat tenderizer device comprising a body having a tubular portion and an enlarged head. A plunger is mounted for reciprocating movement within the tubular portion and has a seal thereon thereby isolating the volume between the seal and the head. The head has circumferentially spaced axially extending projections with tapered points and passages extending from the projections to the area within said tubular portion between the seal and the head. The passages have one end terminating in spaced relation to the points and the other end extending axially and radially inwardly to the interior of the tubular portion of the body.

13 Claims, 2 Drawing Figures

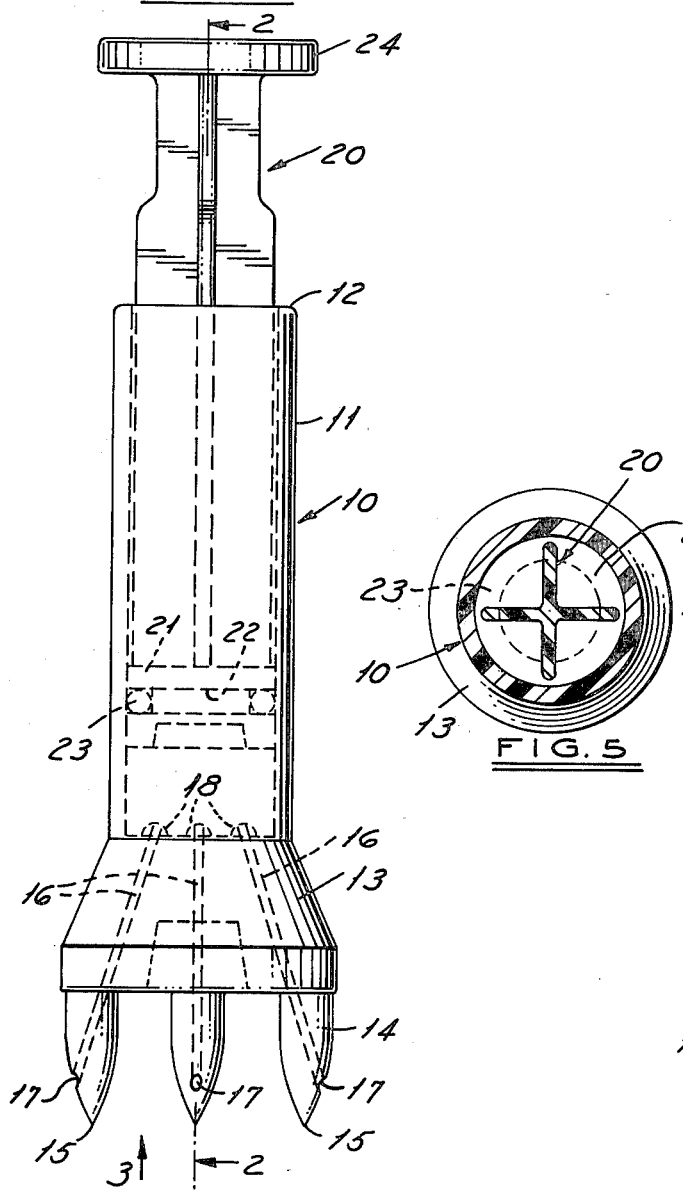
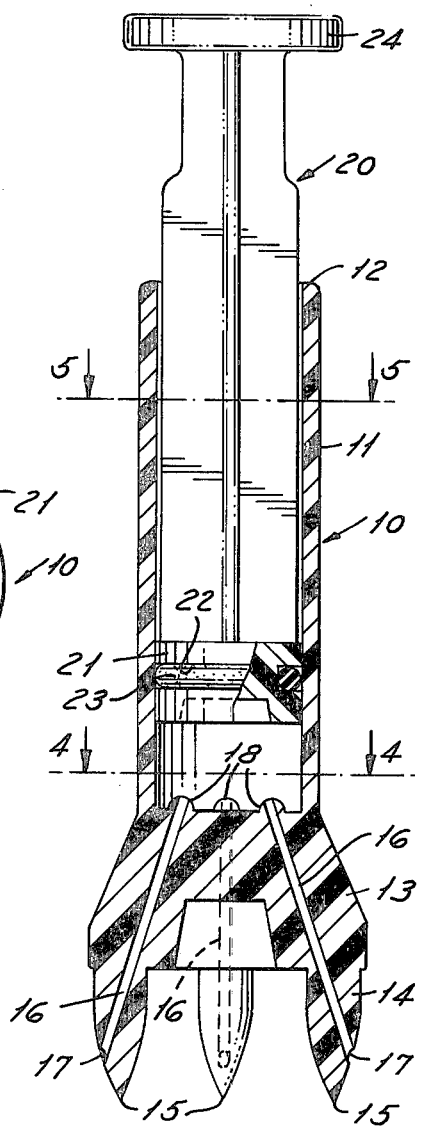
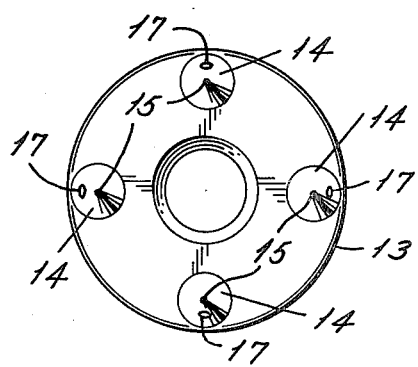
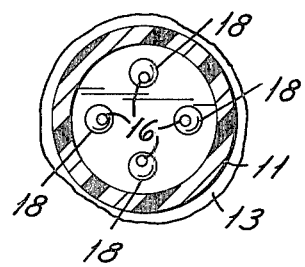

MEAT TENDERIZER DEVICE

This invention relates to meat tenderizers.

BACKGROUND OF THE INVENTION

It has long been known that tenderizers may be utilized with meat to make the meat more edible and appetizing. It has heretofore been suggested that tenderizers may be applied by suitable implements such as syringes which inject the tenderizer into the meat.

Among the objects of the invention are to provide a simple, low cost, easily manufactured, easily cleaned meat tenderizer device which has a minimum number of parts.

SUMMARY OF THE INVENTION

In accordance with the invention, the meat tenderizer device comprises a body having a tubular portion and an enlarged head. A plunger mounted for reciprocating movement within the tubular portion and has a seal thereon thereby isolating the volume between the seal and the head. The head has circumferentially spaced axially extending projections with tapered points and passages which extend from said projections to the area within the tubular portion between the seal and the head. The passages have one end terminating in spaced relation to said points and the other end extending axially and radially inwardly to the interior of the tubular portion of the body.

DESCRIPTION OF THE DRAWINGS

FIG. 1 is an elevational view of a meat tenderizer device embodying the invention.

FIG. 2 is a sectional view taken along the line 2—2 in FIG. 1.

FIG. 3 is a view taken in the direction of the arrow 3 in FIG. 1.

FIG. 4 is a sectional view taken along the line 4—4 in FIG. 2.

FIG. 5 is a sectional view taken along the line 5—5 in FIG. 2.

DESCRIPTION

Referring to FIGS. 1 and 2, the meat tenderizer device embodying the invention comprises a body 10 having a tubular portion 11 that is substantially cylindrical and has an open upper end 12 and a lower end closed by an enlarged head 13 herein shown as generally frustoconical. The body 10 further includes circumferentially spaced axially extending projections 14 which are generally bullet shaped and have free ends terminating in points 15.

Straight passages 16 of uniform cross sectional area extend from the outer periphery of said projections 14 at an area 17 spaced from the end of points 15 in a straight line axially and radially inwardly to the interior of the tubular portion 11. The upper ends of the passages 16 extend through protrusions 18 which are provided to facilitate manufacture in one piece from plastic.

A plunger 20 having a piston 21 thereon is provided for reciprocating movement in the tubular portion 11 and includes a groove 22 into which an O-ring 23 is seated to provide a seal with the interior of the tubular portion. The portion of the plunger 20 above the piston 21 is of reduced cross sectional area as shown in FIG. 5 and a flat enlarged head 24 is provided on the upper end to serve as a means for pushing and pulling the plunger relative to body 10.

As can be seen, the enlarged head 13 has the projections 14 positioned thereon in such a manner that the points 15 are spaced radially outwardly from the periphery of the tubular portion 11. The lower ends of passages 16 are spaced from the points 15 in order to minimize chances of clogging the passages in use. The major portion of the length of each passage 16 is within enlarged head 13.

In order to use the meat tenderizer device, the liquid tenderizing condiments are provided in the tubular portion and the plunger is inserted. The user then grasps the tubular portion 11 and forces the projections 14 into the meat in a vigorous downward movement. After the projections are inserted in the meat, the plunger 24 is forced downwardly to cause the tenderizing condiments to pass through the passages 16 into the meat. The process is repeated at several areas across the surface of the meat on both sides.

After usage, the plunger is removed and the plunger and body 10 can be readily cleaned with detergent and the like.

Both the body 10 and plunger 20 are preferably made of plastic such as polypropylene.

I claim:

1. In a meat tenderizer device, the combination comprising a body having a tubular portion, said body having an enlarged head on one end of said tubular portion, a plunger mounted for reciprocating movement within said tubular portion and having a sealing means thereon thereby isolating the volume between said seal plunger and said head, said head having circumferentially spaced axially extending projections with tapered free ends forming points, and a straight passage extending from each said projection through said projection and said head to the area within said tubular portion between said sealing means and said head, each said passage having one end terminating in spaced relation to the point of its respective projection, the other end of each said passage extending to the interior of the tubular portion of said body, each of each said passage having the major portion of the length thereof within said enlarged head, said passages extending generally axially and radially inwardly from the periphery of its respective projection through said projection and said head to the interior of said tubular portion.

2. The combination set forth in claim 1 wherein said passages have a substantially uniform cross sectional area throughout the length thereof.

3. The combination set forth in claim 1 wherein said projections are generally bullet shaped.

4. The combination set forth in claim 3 wherein each said projection has a passage associated therewith.

5. The combination set forth in claim 1 wherein the portion of said plunger extending outwardly from said sealing means has a reduced cross sectional area.

6. The combination set forth in claim 1 wherein each said point is spaced radially outwardly from the periphery of said tubular portion.

7. The combination set forth in claim 1 including protrusions extending within said tubular portion and through which said inner ends of said passage extend.

8. In a meat tenderizer device, the combination comprising a plastic body having a cylindrical portion having an open end, said body having an integral enlarged head closing the other end of said cylindrical portion thereof, a plastic plunger mounted for reciprocating movement within said tubular portion and having a seal thereon thereby isolating the volume between said seal plunger and said head, said head having circumferentially spaced axially extending projections with tapered free ends forming points, and passages extending from each said projection through said projection and said head to the area volume within said cylindrical portion between said sealing means and said head, each said passage having one end terminating in spaced relation to the point of its respective projection, the other end of each said passage extending to the interior of the cylindrical portion of said body, each said passages extending generally axially and radially inwardly from the outer periphery of its respective projections through said projection and said head to the interior of said cylindrical portion, each said passage having the major portion of the length thereof within said enlarged head, said passages being straight and having a substantially uniform cross sectional area throughout the length thereof.

9. The combination set forth in claim 8 wherein said projections are generally bullet shaped.

10. The combination set forth in claim 8 wherein each said projection has a passage associated therewith.

11. The combination set forth in claim 8 wherein the portion of said plunger extending outwardly from said sealing means has a reduced cross section.

12. The combination set forth in claim 8 wherein each said point is spaced radially outwardly from the periphery of said cylindrical portion.

13. The combination set forth in claim 8 including integral protrusions on said head extending within said cylindrical portion and through which said inner ends of said passage extend.

* * * * *